United States Patent
Buyse

(10) Patent No.: US 8,050,670 B2
(45) Date of Patent: Nov. 1, 2011

(54) SYSTEM AND METHOD FOR TESTING A MOBILE TELEPHONE NETWORK

(75) Inventor: Olivier Buyse, Rue Arnoult Crapotte (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 10/553,942

(22) PCT Filed: Feb. 26, 2004

(86) PCT No.: PCT/FR2004/050085
§ 371 (c)(1), (2), (4) Date: Mar. 15, 2006

(87) PCT Pub. No.: WO2004/095866
PCT Pub. Date: Nov. 4, 2004

(65) Prior Publication Data
US 2006/0223521 A1    Oct. 5, 2006

(30) Foreign Application Priority Data
Apr. 22, 2003 (FR) ...................................... 03 50120

(51) Int. Cl.
*H04W 24/00* (2009.01)
(52) U.S. Cl. ........ 455/423; 455/424; 455/425; 455/446; 455/67.11; 370/241; 370/254
(58) Field of Classification Search .................. 455/446, 455/67.1, 67.14, 423–425, 67.11; 370/241, 370/254
See application file for complete search history.

(56) References Cited

U.S. PATENT DOCUMENTS

| | | | |
|---|---|---|---|
| 5,471,649 A | 11/1995 | Rees et al. | |
| 6,154,638 A * | 11/2000 | Cheng et al. | 455/67.11 |
| 6,169,896 B1 * | 1/2001 | Sant et al. | 455/424 |
| 6,434,364 B1 | 8/2002 | O'Riordain | |
| 6,748,209 B2 * | 6/2004 | Lipsit | 455/411 |
| 6,928,280 B1 * | 8/2005 | Xanthos et al. | 455/423 |
| 2003/0100299 A1 * | 5/2003 | Ko et al. | 455/423 |
| 2004/0203727 A1 * | 10/2004 | Abiri et al. | 455/423 |

FOREIGN PATENT DOCUMENTS

| | | |
|---|---|---|
| CN | 1336084 | 2/2002 |
| EP | 1 182 897 A1 | 2/2002 |
| WO | WO 99/23849 | 5/1999 |

OTHER PUBLICATIONS

"Digital cellular telecommunications system (Phase 2); Radio subsystem link control (GMS 05.08)," European Telecommunications Standards Institute, Jan. 1997, Eighth Edition, 37 pages.

\* cited by examiner

*Primary Examiner* — Kamran Afshar
*Assistant Examiner* — Kathy Wang-Hurst

(57) ABSTRACT

A method for testing a mobile telephony network having a plurality of cells whose sizing depends on at least one selection or reselection parameter comprises a step for the recording, on an onboard computer connected to a mobile telephone, of predefined values of selection and reselection parameters for each cell to be tested, a step for the presetting, for each cell to be tested, of the predefined values of the selection and reselection parameters, and for the capture of data obtained by the mobile telephone for each cell, and a step for the processing of the captured data and the determining of the sizing of each cell. The system for implementing this method is also disclosed.

6 Claims, 2 Drawing Sheets

SYSTEM AND METHOD FOR TESTING A MOBILE TELEPHONE NETWORK

RELATED APPLICATION

This application claims priority to PCT Application No. PCT/FR2004/050085 filed Feb. 26, 2004, and French Application No. 03/50120 filed Apr. 22, 2003.

TECHNICAL FIELD

The invention pertains to a method and a system for testing a mobile telephony network, in which the selection or reselection parameters are preset in order to optimize the mobile telephony network or cell network. The method of the invention consists in assessing the geographical size of the different cells of the cell network, for different values of the selection and reselection parameters. It can be used to determine the values of parameters giving the network the desired optimum configuration. The system of the invention enables this method to be implemented.

The invention finds application in mobile telephony and, especially, in the maintenance and optimization of mobile telephony networks.

BACKGROUND OF THE INVENTION

Mobile telephony uses networks known as cell networks or mobile telephony networks to link mobile telephones with other fixed or mobile telephone terminals. These cell networks comprise base stations, each governing geographical cells through which mobile telephones located in these cells can be linked up with other telephones that might be located outside these cells.

For the radio link between the mobile telephone and the network to be of adequate quality, the operator of the network places a set of base stations on the territory to be covered so that the mobile telephone is always within less than a few kilometers from one of these base stations. For this purpose, the territory divided into several cells each constituting an area in which a mobile telephone can set up a link with a base station.

In general, the operator of the network tries to cover the territory with a set of cells that are contiguous and at least partly overlap one another. The size of the cells and their positioning relative to one another, i.e. the sizing of the cells, depends on the number of call connections which it should be possible to set up simultaneously in a same cell. Thus, in urban zones which are particularly dense in mobile telephone communications, the operator chooses small cells with a radius of some hundreds of meters, to let through substantial traffic per surface unit. On the contrary, in rural zones with low-density telephone communications, the cells are larger-sized with a radius of the order of some kilometers.

To take account of these different criteria, the operator first of all prepares a theoretical network map on which he places the base stations at the most appropriate places and sizes the cells and the mutual overlapping of the cells. However, on the ground, the size of the cells does not necessarily correspond to what may be planned in the theoretical network map. The operator then seeks to optimize the network to make it resemble the theoretical network map as closely as possible or eliminate problems that have not been foreseen in the theoretical model.

Furthermore, traffic density is a criterion that fluctuates over time. It depends on different factors, such as vacation periods during which the traffic diminishes in urban areas and increases at the seaside or in the mountains. For the operator, it is therefore important not only to optimize his network but also to ascertain that the optimization is still valid and, if necessary, modify the sizing of the cells to make this optimization valid. The sizing of the cells can be optimized by modifying parameters, called selection parameters and reselection parameters, that are proper to each cell.

Tools for testing mobile telephony networks have been developed in order to obtain this optimization.

The systems described in the patent applications EP1182897, EP1098546 or US20020155831 are examples.

These test tools can be used, after exploration of the zones to be studied, to determine the size of each cell. These testing apparatuses are, in practice, mobile telephones associated with a microcomputer which records the working parameters, along the network path, of the cell phone environment and the signal and service quality.

At present, to carry out this optimization, the operator uses a test system comprising one or more test mobile phones used in association with the control center of the network. The test telephone is put on board an automobile type of vehicle for example, by its user. It thus moves about in the geographical zones corresponding to the cells for which the user wishes to optimize the cell subdivisions and, for this purpose, optimizes the selection and reselection parameters. For each cell of the geographical zone to be measured, and for each selection or reselection parameter or set of parameters to be tried, the operator must telephone the control center of the network and ask this center to modify the selection or reselection parameters for the cells in which he is moving. Each time the parameters are modified, the user has to move in the cells and collect coverage data and then analyze the results obtained. If these results are not suitable, he must again telephone the network management center to ask for a new modification of parameters and then again make a data-collection journey and analyze fresh results.

This technique is a trial-and-error method, which necessitates restrictive coordination between the user and the operation and maintenance center (OMC); indeed, the user must transmit the list of the parameters to be configured for the different cells to be verified. This is a painstaking operation. It may be falsified by the data entry errors which the user cannot control and, above all, it causes disturbance in the entire network, each time that a parameter is modified by the OMC, and it may give rise to poor service quality during the testing of the different values of parameters.

SUMMARY OF THE INVENTION

The invention is aimed precisely at overcoming the drawbacks of the techniques explained here above. To this end, it proposes an autonomous system and an autonomous method for testing a mobile telephony network used to preset the selection and reselection parameters of the cells of the network, using a computer connected to the testing mobile telephone. The invention can thus be used for the simulation, solely at the level of the mobile test telephone, of a modification of the selection and reselection parameters of the network and enables the measurement of the effects of such a modification without action by the control center and without any disturbance of the network.

More specifically, the invention relates to a system for testing a mobile telephony network having a plurality of cells whose sizing depends on at least one selection or reselection parameter, of the type comprising one or more mobile test phones and an onboard computer connected to the mobile telephone or telephones. An object of the invention is essentially a system in which predefined values of the selection and reselection parameters are stored in the computer and in which the mobile telephones comprise, a presetting function to receive the predefined value of the selection and reselection parameters.

The invention also relates to a method for testing a mobile telephony network having a plurality of cells whose sizing is a function of at least one selection or reselection parameter, wherein the method comprises the following steps:
- the recording, in the computer, of predefined values of the selection and reselection parameters for each cell of the zone to be tested,
- the presetting, for each cell of the zone to be tested, of the predefined values of the selection and reselection parameters, and the capture of data obtained by the mobile telephone for each cell,
- the processing of the captured data and the determining of the sizing of each tested cell.

DETAILED DESCRIPTION OF THE INVENTION

Figure 1:
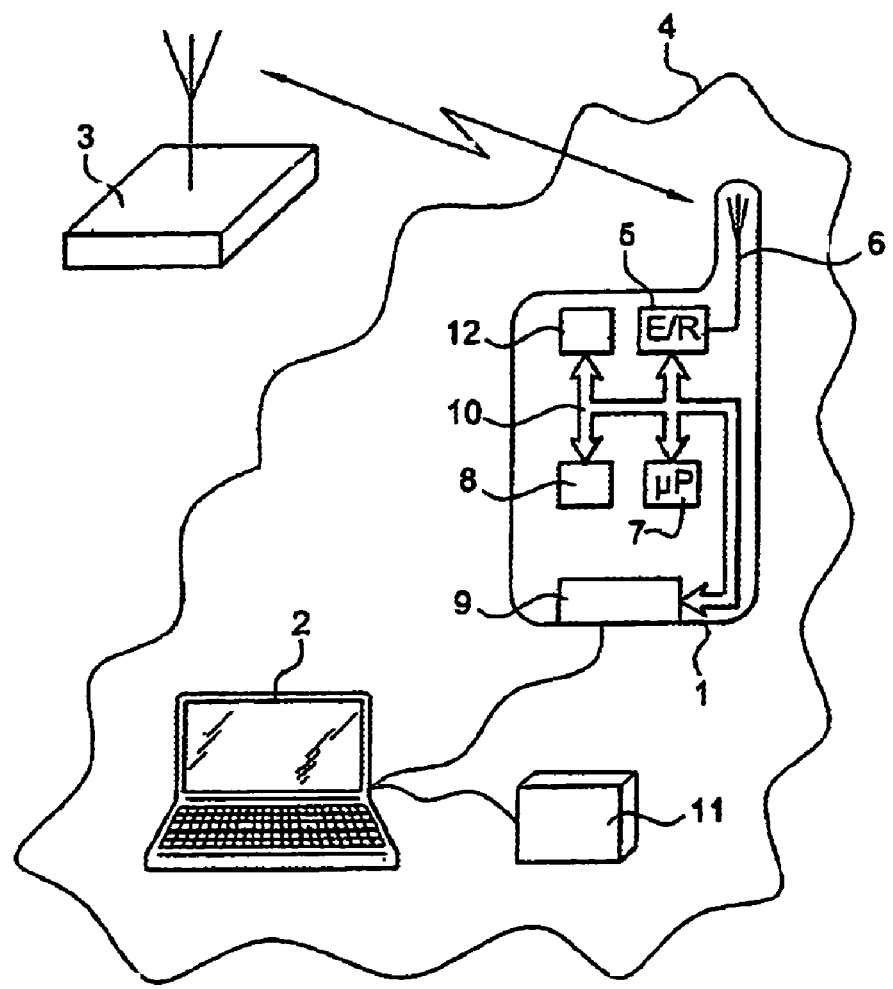
FIG. 1 shows a system for testing a mobile telephony network according to the invention.

In a mobile telephony network and, especially, in the network according to the GSM standard, a mobile telephone is in a state of listening to the network and makes a selection, from among all the cells that surround it, of the best cell, namely the cell that gives it the best reception and transmission quality. The mobile telephone then tunes into this best cell or positions itself in this best cell. This cell is called the server. It then measures the other cells that it may receive and keeps up to date the list of the six best cells called neighbor cells. The change of server is called reselection; it is made among the six best neighbor cells according to an algorithm that is defined by the GSM 05.08 and takes account of the criteria C1, C2 for the GSM and C1, C31, C32 for the GPRS.

In other words, the selection and reselection parameters are the parameters that can be used to modify the geographical sizing of each cell of the network.

The coefficient C1 is computed by the mobile telephone as a function of several parameters and especially as a function of the reception level RX_-LEV and a threshold RXLEV_-ACCESS_-MIN. The reception level RX_LEV is the level of the signal that it receives at its antenna. The threshold RXLEV_ACCESS_MIN is the weighting value, particular to each cell, applied by the operator at the reception level RX_LEV. The coefficient C1 is constituted as a first approximation according to the following formula:

$$C1 = RX\_LEV - RXLEV\_ACCESS\_MIN.$$

The following values also play a part in the exact computation of the C1: MS_TXPWR_MAX_CCH, POWER OFFSET, (the exact formulae for the computation of the parameters C1 and C2 are indicated and explained in the GSM standard 04.08).

The coefficient C2 is computed by the mobile telephone as a function of several parameters and, especially, as a function of C1, a penalty time PENALTY_TIME, a temporary offset TEMPORARY OFFSET and an offset called CELL_RESELECT_OFFSET. The penalization TEMPORARY OFFSET (TO) entails a reduction of the value applied to the coefficient C2 during the penalty time PENALTY_TIME for a cell that enters the list of the six neighbor cells. The offset CELL_RESELECT_OFFSET is an offset applied to the selection parameter for the best cell. The exact computation formula is also given in the GSM 05.08 standard.

To optimize the network, the operator has the possibility of modifying one or more selection parameters, enabling the computation of C1 and C2, i.e. RX_LEV_ACCESS_MIN, MS_TXPWR_MAX_CCH, POWER OFFSET, PENALTY_TIME, TEMPORARY_OFFSET, CELL_RESELECT_OFFSET, the reception level Rx being non-modifiable.

The selection and reselection parameters used to determine C1 and C2 are given by way of an indication. It is clear that the operator can modify any other selection or reselection parameter.

In the invention, before modifying the values of the selection parameters for the tested cell, i.e. the cell in which the mobile telephone is located, the operator can simulate this modification. For this purpose, a predefined value of the selection parameter is imposed on the test mobile telephone which reacts as if it were receiving this selection parameter value from the network. The operator can then carry out a coverage data capture session and deduce the results by analysis and processing of the captured data. When several simulations have been made, the most appropriate dimensioning for the tested cell can be deduced therefrom.

FIG. 1 shows the system of the invention for testing a mobile telephony network. This testing system has a mobile test telephone 1, connected to a PC type computer 2. Preferably, the computer 2 is a laptop. The set formed by the mobile telephone and the computer is incorporated, for example, into an automobile.

The mobile test telephone 1 is made according to the same architecture as the usual mobile telephone. It therefore comprises a transmission/reception device 5 enabling it to be connected radio-electrically to a mobile telephony network by means of the base station 3.

In FIG. 1, the mobile telephone is represented within a space 4. This space 4 schematically represents a cell of the mobile telephony network to be optimized.

The transmission/reception device 5 is also connected to the antenna 6 of the mobile telephone. The mobile telephone 1 also has a microprocessor 7 controlled by a program in a program memory 8 and a data and command bus 10 providing communication between the different elements of the telephone. The mobile telephone also has an interface 9 used to connect the mobile telephone to external devices. In the invention, this interface is used to connect the mobile test telephone to the computer 2.

The mobile test telephone of the invention has a presetting circuit 12, connected by the bus 10 to the other devices of the mobile telephone. This presetting circuit 12 for its part enables the reception and storage of the values transmitted by the computer 2. In the invention, these values are predefined values of the selection parameter or parameters for the cell to be tested, preliminarily stored in the computer.

Thus, the mobile telephone of the system of the invention may be either in normal mode and receive the values of the selection parameters from the mobile telephony network of or in preset mode and receive the predefined values of the selection parameters given by the computer. When the mobile telephone is in preset mode, the presetting function overwrites the values of the parameters received from the network and replaces the values by the predefined values transmitted by the computer.

Thus, the user of the mobile telephone can test a predefined value of selection parameters for each cell without the other mobile telephones located in the same cell being subjected to these values of parameters.

The test system of the invention also has a GPS type localizing device 11. This GPS device 11 enables the geographical location of the cells tested relative to the mapping system. This GPS device may be either a distinct element connected to the computer, as shown in FIG. 1, or a device integrated into the automobile, or a software program integrated into the computer.

Figure 2:
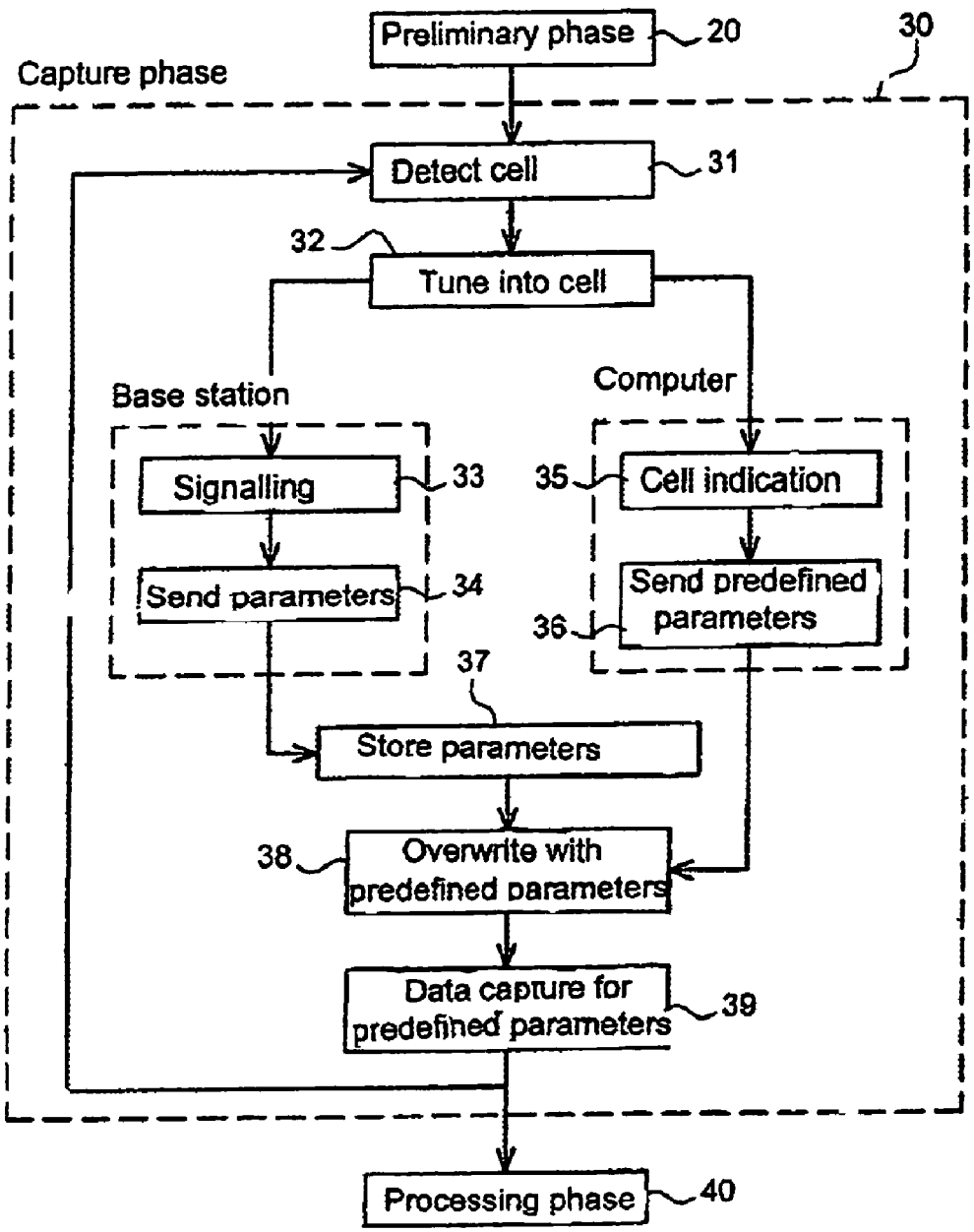
FIG. 2 is a functional diagram of the different steps of the method of the invention.

FIG. 2 shows a functional diagram of the method of the invention implemented by the system that has just been described. This method has three phases: a preliminary phase 20, a capture phase 30 and a processing phase 40.

The preliminary phase 20 is a step of configuration of the cells to be tested and of the values of the selection parameters for these cells. These chosen values are predefined values for which it is sought to analyze the behavior of the mobile telephone. These predefined values are recorded in the computer, in a specific memory. More specifically, this preliminary phase 20 consists of the configuring, in the software program of the computer to be connected to the mobile test telephone, of the zone that the user plans to go through with the mobile test telephone during the test, i.e. during the capture phase 30, as well as the configuring of the selection parameters for the cells of this zone which the user wishes to test. In other words, in the software of the computer, the values of the selection parameters are configured for all the cells, known as server cells, that the mobile phone is likely to tune into, as well as all the cells neighboring these server cells.

This preliminary phase may be executed in any place whatsoever, for example in the network management center or else at user's residence or in any other workplace of the user.

The next phase of the method of the invention is a capture phase 30. During this capture phase, the user travels through the planned test zone with his mobile test telephone and the onboard computer. From the data of the mobile telephone, the computer software program constantly identifies the server cell and the neighboring cells (step 31). Each time that the software program detects a new cell (step 32), it will read the values of the parameters to be preset in its memory (step 33) and then the computer will send these parameters to the mobile telephone (step 34) and finally the mobile will preset the values of the parameters in its memories as a replacement for the values received from the network (step 35). As soon as the presetting is done, the mobile telephone returns to the new cell detection phase (step 31).

This method is used to preset the parameters in the mobile telephone only when a cell enters the list of neighbor cells and then enables the mobile telephone to be allowed to perform the reselection algorithm according to the preset parameters and not according to the parameters received from the network. The mobile telephone will adopt this mode of behavior during the data capture phase when the user travels through the earmarked zone (step 36).

The data capture phase consists in jointly recording the identification of the server cell and of the neighboring cells along with the localizing data for each capture point.

The method also enables the recording, for each capture, of the basic physical parameters such as the reception level, the coefficients C1 and C2 and all other traces pertaining to the server cell and neighboring cells.

In this capture phase, the mobile telephone transmits the entire table of measurements that it has made to the computer. The computer thus permanently knows which channels are being received by the mobile telephone, i.e. the cell in which the mobile telephone is located. Since each channel has a corresponding set of predefined parameters to be tested, the computer knows precisely which parameter values it must transmit to the mobile telephone.

This table of measurements may comprise, for example, the list of the different channels with the server and its neighbors. For each of these channels, it may also comprise their reception level RX and their threshold RM as well as the values of the coefficients C1, C2, C31 and C32 computed by the mobile telephone.

The vehicle which has the mobile test telephone and the computer on board travels through an entire geographical zone and, therefore, through several cells. It is thus possible to determine the sizing of all the cells of the zone in which the vehicle is moving.

The method of the invention ends with a processing phase 40. During this processing phase, the computer processes the data captured by the mobile telephone and, from this data, deduces the sizing of each of the tested cells from this data. Thus, the dimensions of the coverage zones of the different cells of the zone traveled through are identified, for example on a mapping background. This is done by the use, in conjunction with the captured data, of the data provided by the GPS. What remains to be done then is to make a choice, as a function of the different parameter values, of the optimum value according to predefined criteria of quality.

As will be understood from the above, the method of the invention can be implemented for only one selection parameter to be tested or for several selection parameters of a same cell. By combining the sizing of all the cells of the zone, the operator can optimize this zone and then combine this zone with all the zones that have been tested in the same way to optimize the entire mobile telephony network.

To further increase the number of values of parameters tested in a single journey, it is possible to implement the method of the invention with several mobile test telephones simultaneously. The system of the invention then comprises several mobile test telephones connected to a same computer, for example three or four mobile telephones. In this case, the same computer gives each mobile test telephone predefined values of parameters that are different for each telephone. This system has the advantage of making it possible, in a single journey through the zone to be optimized, to test several sets of parameters and therefore to determine several possible configuration for a same geographical zone.

In this system with several mobile telephones, it is also possible to preset the same set of parameters for each telephone and then take an average of the results obtained in order to obtain a more precise value of measurements.

The method of the invention can be implemented as described here above, for parameters used to determine the coefficients C1. It can also be implemented for parameters used to determine the reselection criterion C2. This coefficient C2 is used to take account of the speed of movement of the mobile telephones.

To this end, the coefficient C2 brings a penalty time and a temporary offset into play. This temporary offset TO consists of a deliberate diminishing of the reception level of the cell by a certain number of dB during a penalty time PT. For example, it is possible to apply a temporary offset of −10 dB for 20 seconds to certain cells. Thus, when the mobile telephone is moving swiftly in the zone, it may cross the cell for 20 seconds. This means that, at the end of these 20 seconds, the mobile telephone will have come out of the cell. Since there is a temporary offset of −10 dB, the mobile telephone will not have considered the cell as being the one with the best coefficient C1 and will not tune in to it. However, if the telephone is still in the same cell at the end of the 20-second temporary offset, then the telephone will tune in to this cell since the temporary offset has ended. It is thus possible, from this, to deduce whether the cell crossed by the mobile telephone is a small cell or a large cell and/or whether it is crossed at high speed or slowly.

This penalty time PT and this temporary offset TO are also reselection parameters particular to each cell. They may therefore be set according to the method of the invention. Similarly, the reselection parameters CRO reselect-offset) or CRH (cell-reselect-hysteresis) or CRPI (cell-reselect-param-ind) may be set according to the method of the invention. For example, the parameter CRH enables a cell to be penalised relative to another cell, either in the event of a change of GSM localisation zone, or simply in the event of a change of GPRS transfer cell. Indeed, a mobile telephone that passes from one localisation zone to another sends out a signal at each change of zone. This signal immobilizes the resource for a certain period of time. If several mobile telephones send out their signals simultaneously, then it is important to minimize the signaling and, for this purpose, to reduce the number of passages from one cell to another. In this case, the CRH parameter may be augmented to penalize any link-up with the new cell rather than the old cell, so that it ca be certain the new cell truly has a better coefficient C1 then the old one. If the new cell does not have a better coefficient C2 than the old cell, then there is no change of cells and the mobile telephone does not send any signal.

Throughout the above description, the selection or reselection parameters, given as examples, are parameters proper to the GSM mode. It must be noted that all the transmission modes have selection or reselection parameters that may be modified. For examples, in the GPRS mode, the selection parameters are HCS-THR, GPRS-TEMPORARY-OFFSET, or GPRS-PENALTY-TIME parameters or again PRIORITY-CLASS parameters etc. The method of the invention can be implemented for all transmission modes and for all selection and reselection parameters.

The method and the system of the invention have the advantage of enabling an assessment of the different values of selection or reselection parameters without necessitating any modification of these parameters in the network for the entire zone tested, i.e. without disturbance of the network. it also enables the assessment of the different values of selection parameters without any need for coordination between the operator's different technical teams, i.e. between the user of the mobile test telephone and the persons located in the control center of the network.

What is claimed is:

1. A test system for testing a mobile telephony network having a plurality of cells, a geographical sizing of each cell depending on at least one selection or reselection parameter, the at least one selection or reselection parameter being used to modify said geographical sizing, the system comprising:
   at least one mobile test telephone adapted to select a server cell among plural cells at a given location, said server cell being selected on the basis of the selection or reselection parameters of said plural cells stored by the at least one mobile test telephone; and
   an onboard computer connected to the at least one mobile test telephone,
   wherein predefined values of selection or reselection parameters are stored in the computer, and
   wherein each mobile test telephone includes a presetting function to receive and store the predefined value of the selection and reselection parameters, each mobile test telephone being shiftable between a normal mode in which the mobile test telephone receives values of the selection or reselection parameters from the mobile telephony network and stores these values, and a preset mode in which said mobile test telephone receives the predefined values of the selection or reselection parameters from the onboard computer and stores these values, the predefined values of selection or reselection parameters overwriting the values of the selection or reselection parameters received from the mobile telephony network; and
   wherein the onboard computer further comprises means for transferring to each mobile test telephone in preset mode predefined values of selection or reselection parameter corresponding to said plural cells.

2. The test system according to claim 1, further comprising an onboard GPS unit associated with the at least one mobile test telephone and with the onboard computer for determining said given location.

3. The test system according to claim 1, wherein the selection or reselection parameter is a parameter making it possible to determine a coefficient C1 or C2 for a GSM mode, or a coefficient C31 or C32 for a GPRS mode.

4. The test system according to claim 1, wherein several mobile test telephones are connected to the onboard computer.

5. A test method for testing a mobile telephony network having a plurality of cells, a geographical sizing of each cell depending on at least one selection or reselection parameter, the at least one selection or reselection parameter being used to modify said geographical sizing, the test method being implemented by a system comprising:
   at least one mobile test telephone adapted to select a server cell among plural cells at a given location, said server cell being selected on the basis of the selection or reselection parameters of said plural cells; and
   an onboard computer connected to the at least one mobile test telephone, wherein predefined values of selection or reselection parameters are stored in the computer; and
   wherein each mobile test telephone includes a presetting function to receive and store the predefined value of the selection and reselection parameters, each mobile test telephone being shiftable between a normal mode in which the mobile test telephone receives values of the selection or reselection parameters from the mobile telephony network and stores these values, and a preset mode in which said mobile test telephone receives the predefined values of the selection or reselection parameters from the onboard computer and stores these values, the predefined values of selection or reselection parameters overwriting the values of the selection or reselection parameters received from the mobile telephony network; and
   wherein the onboard computer transfers to each mobile test telephone in preset mode predefined values of selection or reselection parameter corresponding to said plural cells.

6. A determining method for determining a configuration of a mobile telephony network having a plurality of cells, a geographical sizing of each cell depending on at least one selection or reselection parameter, the at least one selection or reselection parameter being used to modify said geographical sizing, the determining method being implemented by a system comprising:

at least one mobile test telephone adapted to select a server cell among plural cells at a given location, said server cell being selected on the basis of the selection or reselection parameters of said plural cells; and an onboard computer connected to the at least one mobile test telephone, wherein predefined values of selection or reselection parameters are stored in the computer; and wherein each mobile test telephone includes a presetting function to receive and store the predefined value of the selection and reselection parameters, each mobile test telephone being shiftable between a normal mode in which the mobile test telephone receives values of the selection or reselection parameters from the mobile telephony network and stores these values, and a preset mode in which said mobile test telephone receives the predefined values of the selection or reselection parameters from the onboard computer and stores these values, the predefined values of selection or reselection parameters overwriting the values of the selection or reselection parameters received from the mobile telephony network, wherein the onboard computer transfers to each mobile test telephone in preset mode predefined values of selection or reselection parameter corresponding to said plural cells; and wherein the configuration of the telephony network is determined on the basis of signal reception level values determined by the at least one mobile test telephone for various predefined values of selection or reselection parameter.

* * * * *